US012419468B2

(12) United States Patent
Lai et al.

(10) Patent No.: US 12,419,468 B2
(45) Date of Patent: Sep. 23, 2025

(54) WATER OUTLET MECHANISM FOR ADJUSTING MIXED RATIO OF FUNCTIONAL LIQUID AND WATER

(71) Applicant: Xiamen Solex High-Tech Industries Co., Ltd., Fujian (CN)

(72) Inventors: Honghui Lai, Fujian (CN); Lian Zhang, Fujian (CN); Tingke Liu, Fujian (CN); Mingfu Zhang, Fujian (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 273 days.

(21) Appl. No.: 18/127,031

(22) Filed: Mar. 28, 2023

(65) Prior Publication Data

US 2023/0225567 A1 Jul. 20, 2023

Related U.S. Application Data

(63) Continuation of application No. PCT/CN2021/142031, filed on Dec. 28, 2021.

(30) Foreign Application Priority Data

Dec. 29, 2020 (CN) ........................ 202011590170.1

(51) Int. Cl.
*A47K 5/12* (2006.01)
*B05B 1/30* (2006.01)

(52) U.S. Cl.
CPC . *A47K 5/12* (2013.01); *B05B 1/30* (2013.01)

(58) Field of Classification Search
CPC .................. A47K 5/12; A47K 5/1211; A47K 2005/1218; B05B 1/30; B05B 7/12; B05B 12/1436; B05B 1/18; B05B 7/2464
See application file for complete search history.

(56) References Cited

U.S. PATENT DOCUMENTS 4,099,672 A * 7/1978 Sheahan ............... B05B 7/2445 239/317
4,135,646 A * 1/1979 Shaw .................... B05B 7/2443 239/305

(Continued)

FOREIGN PATENT DOCUMENTS

CN 101922570 A 12/2010
CN 106089817 A 11/2016

(Continued)

OTHER PUBLICATIONS

Corresponding International Patent Application No. PCT/CN2021/142031, International Search Report, date mailed Mar. 28, 2022.

(Continued)

*Primary Examiner* — Bob Zadeh
(74) *Attorney, Agent, or Firm* — Cooper Legal Group, LLC

(57) ABSTRACT

A water outlet mechanism for adjusting a mixed ratio of a functional liquid comprises a water operated pump driven by water power, a functional liquid storage chamber, a water outlet channel, a water inlet channel, and a flow rate adjustment mechanism. A liquid inlet of the water operated pump is in communication with the functional liquid storage chamber, a liquid outlet of the water operated pump is in communication with the water outlet channel or the water inlet channel, and the flow rate adjustment mechanism is configured to adjust a water flow rate of the water in the water inlet channel for driving the water operated pump so as to change a suction frequency of the water operated pump.

10 Claims, 4 Drawing Sheets

(56) References Cited

U.S. PATENT DOCUMENTS

| | | | | |
|---|---|---|---|---|
| 6,419,166 | B1 * | 7/2002 | Brzezinski | B05B 7/2462 222/395 |
| 2013/0056086 | A1 * | 3/2013 | Strauli | E03C 1/046 137/15.01 |
| 2013/0105016 | A1 | 5/2013 | Liu | |
| 2013/0340854 | A1 | 12/2013 | Quinn et al. | |
| 2020/0197960 | A1 | 6/2020 | Zhang et al. | |
| 2023/0225567 | A1 * | 7/2023 | Lai | B05B 1/18 222/190 |

FOREIGN PATENT DOCUMENTS

| | | | | |
|---|---|---|---|---|
| CN | 205904000 | U | 1/2017 | |
| CN | 206881278 | U | 1/2018 | |
| CN | 207042695 | U | 2/2018 | |
| CN | 208449655 | U | 2/2019 | |
| CN | 209076935 | U | 7/2019 | |
| CN | 110170398 | A | 8/2019 | |
| CN | 209406614 | U | 9/2019 | |
| CN | 207316150 | U | 11/2019 | |
| CN | 209663208 | U | 11/2019 | |
| CN | 211385439 | U | 9/2020 | |
| CN | 211801705 | U | 10/2020 | |
| CN | 215354066 | U | 12/2021 | |
| DE | 102010008750 | A1 * | 8/2011 | B05B 7/005 |
| DE | 102012019340 | A | 4/2014 | |
| EP | 0443399 | A2 * | 8/1991 | |
| FR | 2870756 | A1 | 12/2005 | |
| GB | 924184 | A | 4/1963 | |
| GB | 2216815 | A | 10/1989 | |
| JP | 1987148189 | U | 9/1987 | |
| JP | 2000107061 | A | 4/2000 | |
| JP | 2000197575 | A * | 7/2000 | |
| JP | 2013005861 | A | 1/2013 | |
| JP | 2019103755 | A | 6/2019 | |

OTHER PUBLICATIONS

Corresponding International Patent Application No. PCT/CN2021/142031, Written Opinion, date mailed Mar. 28, 2022.

First CN Office Action cited in CN202011590170.1, mailed Nov. 1, 2024, 8 pages.

Second CN Office Action cited in CN202011590170.1, mailed Mar. 7, 2025, 10 pages.

Third CN Office Action cited in CN202011590170.1, mailed May 9, 2025, 10 pages.

Written Opinion cited in JP 2023534051, mailed Jul. 30, 2024, 2 pages.

Decision of Grant cited in JP 2023534051, mailed Sep. 3, 2024, 5 pages.

Notice of Reasons for Refusal cited in JP 2023534051, mailed Apr. 17, 2024, 6 pages.

Search Report cited in JP 2023534051, mailed Apr. 1, 2024, 36 pages.

Zhu, et al., "Influence of suction box on energy characteristics of vertical mixed-flow pumping systems", Journal of Jiangsu University (Narural Science Edition), vol. 28., No. 1, Jan. 2007, 5 pages with English abstract.

* cited by examiner

WATER OUTLET MECHANISM FOR ADJUSTING MIXED RATIO OF FUNCTIONAL LIQUID AND WATER

RELATED APPLICATIONS

This application is a continuation of and claims priority to International patent application number PCT/CN2021/142031, filed on Dec. 28, 2021, which claims priority to Chinese patent application number 202011590170.1, filed on Dec. 29, 2020. International patent application number PCT/CN2021/142031 and Chinese patent application number 202011590170.1 are incorporated herein by reference.

FIELD OF THE DISCLOSURE

The present disclosure relates to a water outlet mechanism, and in particular to a water outlet mechanism configured to discharge a functional liquid.

BACKGROUND OF THE DISCLOSURE

The existing beauty shower basically adopts a method of mixing beauty liquid with water, and a mixing degree of the beauty liquid and the water is adjusted by adjusting a flow rate of the water entering a beauty liquid storage cavity to adjust a concentration of the beauty liquid mixed with the water. Due to this design, the beauty liquid can only be used for a short time, and otherwise the water will easily breed bacteria after entering the beauty liquid storage cavity for a long time. As an amount of the water entering the beauty liquid storage cavity increases, the beauty liquid will be diluted in advance in the beauty liquid storage cavity. The effect will be poor, and the mixing concentration of the beauty liquid and the water cannot be accurately controlled.

BRIEF SUMMARY OF THE DISCLOSURE

The present disclosure provides a water outlet mechanism to solve the deficiencies in the background, and a user can control a mixed ratio of a functional liquid and water according to their own needs.

In order to solve the technical problem, the present disclosure provides a water outlet mechanism for adjusting of the mixed ratio of the functional liquid and the water, and the water outlet mechanism comprises a water operated pump driven by a water power, a functional liquid storage chamber, a water outlet channel, a water inlet channel, and a flow rate adjustment mechanism. A liquid inlet of the water operated pump is in communication with the functional liquid storage chamber, and a liquid outlet of the water operated pump is in communication with the water outlet channel or the water inlet channel. The flow rate adjustment mechanism is configured to adjust a water flow rate of the water in the water inlet channel for driving the water operated pump so as to change a suction frequency of the water operated pump.

In a preferred embodiment, the flow rate adjustment mechanism comprises a first water passage hole, a second water passage hole, and an adjusting member for adjusting a water passing area of the second water passage hole.

In a preferred embodiment, the adjusting member moves along an axial direction of the second water passage hole so as to be inserted into or separated from the second water passage hole.

In a preferred embodiment, the flow rate adjustment mechanism comprises a water diversion body, an axis of the water diversion body comprises the second water passage hole, and the water diversion body further comprises a plurality of water diversion holes distributed in rotational symmetry around the second water passage hole to define the first water passage hole.

In a preferred embodiment, the adjusting mechanism is a tapered adjustment core, a side of the tapered adjustment core facing the second water passage hole comprises a tapered column, and the tapered column has a diameter that gradually increases from a first end of the tapered column adjacent to the second water passage hole to a second end of the tapered column.

In a preferred embodiment, the flow rate adjustment mechanism further comprises an operating member for driving the tapered adjustment core to move along the axial direction of the second water passage hole.

In a preferred embodiment, the operating member is disposed outside a water inlet core, and an inside of the water inlet core comprises the water inlet channel A side wall of the water inlet core comprises a position-providing groove extending along a moving direction of the tapered adjustment core, and the operating member is operatively coupled to the tapered adjustment core through the position-providing groove.

In a preferred embodiment, the functional liquid is essence, conditioner, shampoo, shower gel, detergent, or hand soap.

In a preferred embodiment, the water outlet mechanism is a bath shower or a kitchen shower.

In a preferred embodiment, the liquid inlet of the water operated pump is in communication with the functional liquid storage chamber through a liquid inlet pipe, and a diameter of the liquid inlet pipe is unchanged and always in communication with the functional liquid storage chamber and the liquid inlet when a water flow rate of the water passing through the water operated pump is adjusted.

Compared with the existing techniques, the technical solution has the following advantages.

The present disclosure provides the water outlet mechanism for adjusting the mixed ratio of the functional liquid and the water. The above-mentioned shower head is provided by combining beauty and skin care properties with the traditional shower, so that people can perform skin care when bathing, and at the same time a beauty liquid adjustment mechanism (i.e., the flow rate adjustment mechanism 5) is provided and is configured to control the mixed ratio of a beauty liquid (i.e., the functional liquid) and the water through a mechanism that adjusts the suction frequency of the water operated pump, which solves a problem of inaccurate mixing concentration of the beauty liquid (i.e., the functional liquid) and the water and a problem of poor use effect of the beauty liquid when the beauty liquid a beauty liquid storage cavity in a chamber is diluted in advance.

The present disclosure controls the mixed ratio of the functional liquid and the water by the flow rate adjustment mechanism. The suction frequency of the water operated pump can be adjusted according to a concentration of the functional liquid, thereby controlling the mixed ratio of the functional liquid and the water.

DETAILED DESCRIPTION OF THE EMBODIMENTS

Figure 1:
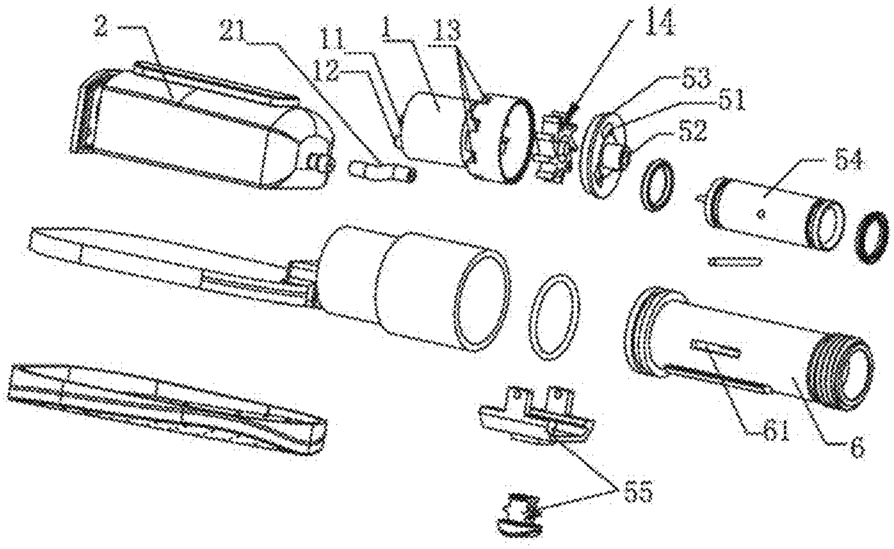
FIG. 1 illustrates a perspective exploded view of a shower head in a preferred embodiment in the present disclosure.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms “upper”, “lower”, “inner”, “outer”, “top/bottom”, etc. indicate the orientation or positional relationship based on the orientation shown in the drawings. The positional relationship is only for the convenience of describing the present disclosure and simplifying the description, rather than indicating or implying that the pointed device or element must have a specific orientation, be constructed, and be operated in a specific orientation. Therefore, the positional relationship should not be understood as a limitation of the present disclosure. In addition, the terms “first” and “second” are only used for descriptive purposes and should not be understood as indicating or implying relative importance.

In the description of the present disclosure, it should be noted that the terms “installed”, “provided with”, “sleeved/connected”, “connected”, etc., should be understood broadly. For example, “connected” can be a fixed connection, a detachable connection, or an integral connection, a mechanical connection, an electrical connection, a direct connection, or an indirect connection through an intermediate medium, and it can be a connection between two members. For those of ordinary skill in the art, the specific meaning of the above terms in the present disclosure can be understood under specific conditions.

Figure 2:
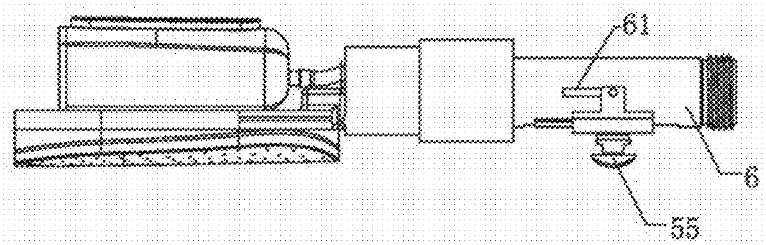
FIG. 2 illustrates a side view of the shower head in a preferred embodiment in the present disclosure, when a water operated pump works at a minimum speed.
Figure 3:
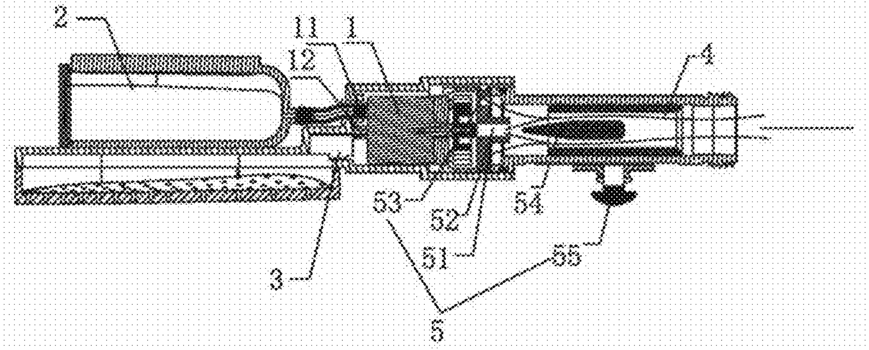
FIG. 3 illustrates a cross-sectional view of the shower head in a preferred embodiment in the present disclosure, when the water operated pump works at the minimum speed.
Figure 4:
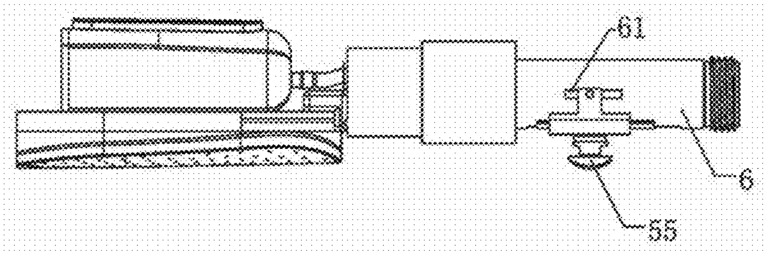
FIG. 4 illustrates a side view of the shower head in a preferred embodiment in the present disclosure, when the water operated pump works at a middle speed.
Figure 5:
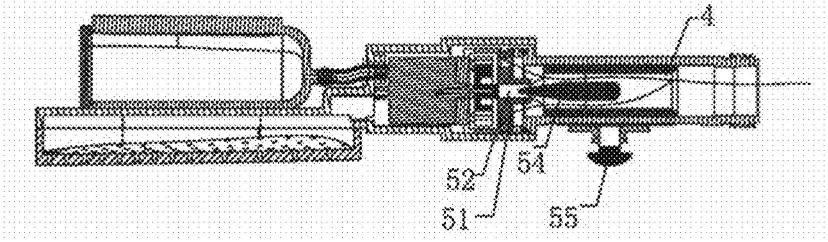
FIG. 5 illustrates a cross-sectional view of the shower head in a preferred embodiment in the present disclosure, when the water operated pump works at the middle speed.
Figure 6:
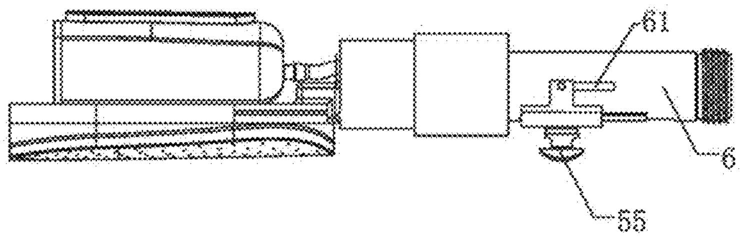
FIG. 6 illustrates a side view of the shower head in a preferred embodiment in the present disclosure, when the water operated pump works at a maximum speed.
Figure 7:
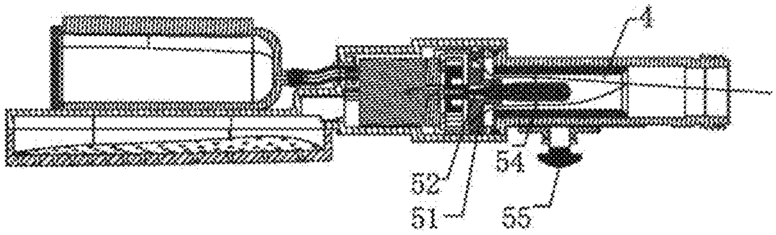
FIG. 7 illustrates a cross-sectional view of the shower head in a preferred embodiment in the present disclosure, when the water operated pump works at the maximum speed.

Referring to FIGS. 1 to 7, a water outlet mechanism for adjusting a mixed ratio of a functional liquid and water is provided. In this embodiment, a shower head is provided as an example. Alternatively, this structure can also be applied to other types of the water outlet mechanisms, such as spray guns, kitchen showers, and the like. The shower head comprises a water operated pump 1 driven by water power, a functional liquid storage chamber 2, a water outlet channel 3, a water inlet channel 4, and a flow rate adjustment mechanism 5.

A liquid inlet 11 of the water operated pump 1 is in communication with the functional liquid storage chamber 2 through a liquid inlet pipe 21, and a liquid outlet 12 of the water operated pump 1 is in communication with the water outlet channel 3. The flow rate adjustment mechanism 5 is configured to adjust a water flow rate of the water in the water inlet channel 4 for driving the water operated pump 1 so as to change a suction frequency of the water operated pump 1. Alternatively, the liquid outlet 12 can be connected to the water inlet channel 4, which is a simple replacement in this embodiment and will not be repeated here.

The above-mentioned shower head is provided by combining beauty and skin care properties with the traditional shower, so that people can perform skin care when bathing, and at the same time a beauty liquid adjustment mechanism (i.e., the flow rate adjustment mechanism 5) is provided and is configured to control the mixed ratio of a beauty liquid (i.e., the functional liquid) and the water through a mechanism that adjusts the suction frequency of the water operated pump 1, which solves a problem of an inaccurate mixing concentration of the beauty liquid (i.e., the functional liquid) and the water and a problem of poor use effect of the beauty liquid when the beauty liquid in a beauty liquid storage cavity in a chamber is diluted in advance.

Structurally, the water operated pump 1 comprises a water driven part and a liquid sucking-and-discharging part. The water driven part comprises an impeller 14 that provides power for the water operated pump 1 and is impacted by the water flow to rotate and a liquid discharge port 13 for discharging the water flow impacting the impeller 14 into the water outlet channel 3. The liquid sucking-and-discharging part comprises the liquid inlet 11 and the liquid outlet 12, and the liquid sucking-and-discharging part is a diaphragm pump structure or a piston pump structure, which are known structures to those of ordinary skill in the art and will not be described herein in detail.

In order to adjust the suction frequency of the water operated pump 1, the flow rate adjustment mechanism 5 comprises a first water passage hole 51, a second water passage hole 52, and an adjusting member for adjusting a water passing area of the second water passage hole 52. The first water passage hole 51 is a main water inlet hole for driving the impeller 14 of the water operated pump 1 to rotate, and the second water passage hole 52 is an auxiliary water inlet hole. By changing the water passing area of the second water passage hole 52, more or less of the water can pass through the second water passage hole 52, and then the water flowing through the first water passage hole 51 will naturally become less or more. Therefore, an amount of the water used to drive the impeller 14 of the water operated pump 1 to rotate decreases or increases, and the suction frequency of the water operated pump 1 decreases or increases.

Specifically, the adjusting member adjusts the water passing area of the second water passage hole 52 in the following manner. The adjusting member moves along an axial direction of the second water passage hole 52 so as to be inserted into or separated from the second water passage hole 52.

The flow rate adjustment mechanism 5 comprises a water diversion body 53, and an axis of the water diversion body 53 comprises the second water passage hole 52. The water diversion body 53 further comprises a plurality of water diversion holes distributed in rotational symmetry around the second water passage hole 52 to define the first water passage hole 51. The first water passage hole 51 is inclined holes, and the second water passage hole 52 is straight holes.

The flow rate adjustment mechanism 5 further comprises a tapered adjustment core 54 as the adjusting member. A side of the tapered adjustment core 54 facing the second water passage hole 52 comprises a tapered column, and the tapered column has a diameter that gradually increases from a first end of the tapered column adjacent to the second water passage hole 52 to a second end of the tapered column.

The flow rate adjustment mechanism 5 further comprises an operating member 55 for driving the tapered adjustment core 54 to move along the axial direction of the second water passage hole 52. The operating member 55 is disposed outside a water inlet core 6, and an inside of the water inlet core 6 comprises the water inlet channel 4. A side wall of the water inlet core 6 comprises a position-providing groove 61 extending along a moving direction of the tapered adjustment core 54, and the operating member 55 is operatively coupled to the tapered adjustment core 54 through the position-providing groove 61.

When in use, the tapered adjustment core 54 is driven to move by sliding of the operating member 55. The tapered adjustment core 54 is a tapered shaft, and through the tapered shaft cooperating with the second water passage hole 52 of the water diversion body 53, when the tapered adjustment core 54 slides, the water passing area of the second water passage hole 52 of the water diversion body 53 is changed. Under a condition that a water passing area of the first water passage hole 51 of the water diversion body 53 remains unchanged, the first water passage hole 51 of the water diversion body 53 achieves water diversion, so that a rotating speed of the water operated pump 1 is changed through changing an impacting speed of the water in the first water passage hole 51 of the water diversion body 53 acting on the impeller, thereby changing a speed at which the water operated pump 1 pumps the functional fluid, thereby changing the concentration of the functional fluid mixed with the water.

The mechanism can also realize a stepless adjustment of the mixed ratio of the functional liquid and the water, specifically.

1) When the functional liquid needs to be pumped at a minimum speed, the operating member 55 needs to be pushed to a position away from the second water passage hole 52. At this time, the tapered shaft of the tapered adjustment core 54 and the second passage of the water diversion body 53 are completely separated, and the tapered adjustment core 54 has no flow-limiting effect on the second water passage hole 52 of the water diversion body 53. At this time, the second water passage holes 52 of the water diversion body 53 have a largest diversion to the first water passage holes 51, the water flow rate of the water flow in the first water passage hole 51 impacting the impeller 14 is the smallest, and the water operated pump 1 pumps the functional liquid at the minimum speed.

2) When the functional liquid needs to be pumped at a speed between a minimum speed and a maximum speed, the operating member 55 can be pushed to any position in a middle except for positions at two ends of the position-providing groove 61. At this time, the tapered shaft of the tapered adjustment core 54 cooperates with the second water passage hole 52 of the water diversion body 53. The tapered adjustment core 54 has a flow-limiting effect on the second water passage hole 52 of the water diversion body 53. At this time, part of the water in the first water passage hole 51 of the water diversion body 53 is diverted to the second water passage hole 52 to reduce a water flow speed of the first water passage hole 51 and an impact force on the impeller 14, thereby reducing the speed at which the water operated pump 1 pumps the functional liquid.

3) When the functional liquid needs to be pumped at the maximum speed, the operating member 55 needs to be pushed to an end of the position-providing groove 61 adjacent to the second water passage hole 52. At this time, the tapered shaft of the tapered adjustment core 54 and the second water passage hole 52 of the water diversion body 53 substantially abut each other, and the tapered adjustment core 54 completely obstructs the water flow into the second water passage hole 52 of the water diversion body 53. At this time, the water flow in the first water passage hole 51 will not be diverted to the second water passage hole 52 of the water diversion body 53. At this time, the water flow rate in the first water passage hole 51 and the impact force on the impeller 14 are the largest, and the water operated pump 1 pumps the functional liquid at the maximum speed.

In this embodiment, the functional liquid is essence, conditioner, shampoo, or shower gel.

The first water passage hole 51 is in communication with the water outlet channel 3 after passing through the impeller 14, and the second water passage hole 52 is also in communication with the water outlet channel 3. An amount of the water passing through the flow rate adjustment mechanism 5 and converging on the water outlet channel 3 is the same as the amount of the water passing through the water inlet channel 4. Therefore, the purpose of adjusting the mixed ratio of the functional solution and the water can be achieved by adjusting a liquid output of the functional solution through the flow rate adjustment mechanism 5.

When the water outlet mechanism of the present disclosure is a spray gun or a kitchen shower, the functional liquid may be detergent or hand soap.

The present disclosure controls the mixed ratio of the functional liquid and the water by the flow rate adjustment mechanism 5. The suction frequency of the water operated pump can be adjusted according to a concentration of the functional liquid, thereby controlling the mixed ratio of the functional liquid and the water. At the same time, a diameter of the liquid inlet pipe 21 connecting between the functional liquid storage chamber 2 and the liquid inlet 11 remains unchanged during an adjustment process. Therefore, the present disclosure has higher flexibility and accuracy for adjusting the mixed ratio of the functional liquid and the water. Especially in places where the viscosity of the beauty serum itself is high, the applicability is very good.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A water outlet mechanism for adjusting a mixed ratio of a functional liquid and water, comprising:
- a water operated pump driven by water power,
- a functional liquid storage chamber,
- a water outlet channel,
- a water inlet channel, and
- a flow rate adjustment mechanism, wherein:
  - a liquid inlet of the water operated pump is in communication with the functional liquid storage chamber,
  - a liquid outlet of the water operated pump is in communication with the water outlet channel or the water inlet channel,
  - the flow rate adjustment mechanism comprises a first water passage hole, a second water passage hole, and an adjusting member, and
  - the adjusting member is configured to adjust a water passing area of the second water passage hole to adjust a water flow rate of the water in the water inlet channel for driving the water operated pump so as to change a suction frequency of the water operated pump.

2. The water outlet mechanism for adjusting the mixed ratio of the functional liquid and the water according to claim 1, wherein:

the adjusting member moves along an axial direction of the second water passage hole so as to be inserted into or separated from the second water passage hole.

3. The water outlet mechanism for adjusting the mixed ratio of the functional liquid and the water according to claim 2, wherein:

the flow rate adjustment mechanism comprises a water diversion body, an axis of the water diversion body comprises the second water passage hole, and the water diversion body further comprises a plurality of water diversion holes distributed in rotational symmetry around the second water passage hole to define the first water passage hole.

4. The water outlet mechanism for adjusting the mixed ratio of the functional liquid and the water according to claim 3, wherein:

the adjusting member is a tapered adjustment core, a side of the tapered adjustment core facing the second water passage hole comprises a tapered column, and the tapered column has a diameter that gradually increases from a first end of the tapered column adjacent to the second water passage hole to a second end of the tapered column.

5. The water outlet mechanism for adjusting the mixed ratio of the functional liquid and the water according to claim 4, wherein:

the flow rate adjustment mechanism further comprises an operating member for driving the tapered adjustment core to move along the axial direction of the second water passage hole.

6. The water outlet mechanism for adjusting the mixed ratio of the functional liquid and the water according to claim 5, wherein:

the operating member is disposed outside a water inlet core, an inside of the water inlet core comprises the water inlet channel, a side wall of the water inlet core comprises a position-providing groove extending along a moving direction of the tapered adjustment core, and the operating member is operatively coupled to the tapered adjustment core through the position-providing groove.

7. The water outlet mechanism for adjusting the mixed ratio of the functional liquid and the water according to claim 1, wherein:

the functional liquid is essence, conditioner, shampoo, shower gel, detergent, or hand soap.

8. The water outlet mechanism for adjusting the mixed ratio of the functional liquid and the water according to claim 1, wherein:

the water outlet mechanism is a bath shower or a kitchen shower.

9. The water outlet mechanism for adjusting the mixed ratio of the functional liquid and the water according to claim 1, wherein:

the liquid inlet of the water operated pump is in communication with the functional liquid storage chamber through a liquid inlet pipe, and a diameter of the liquid inlet pipe is unchanged and always in communication with the functional liquid storage chamber and the liquid inlet when a water flow rate of the water passing through the water operated pump is adjusted.

10. The water outlet mechanism for adjusting the mixed ratio of the functional liquid and the water according to claim 1, wherein the water inlet channel for driving the water operated pump is the first water passage hole.

* * * * *